March 11, 1969 G. A. MASSEY 3,432,770
METHOD AND APPARATUS FOR PRODUCING LIGHT
HAVING A SINGLE FREQUENCY
Filed Nov. 16, 1964

*INVENTOR.*
GAIL A. MASSEY

BY *John F. Lawler*
ATTORNEY

United States Patent Office 3,432,770
Patented Mar. 11, 1969

3,432,770
METHOD AND APPARATUS FOR PRODUCING LIGHT HAVING A SINGLE FREQUENCY
Gail A. Massey, Belmont, Calif., assignor to Sylvania Electric Products Inc., a corporation of Delaware
Filed Nov. 16, 1964, Ser. No. 411,441
U.S. Cl. 331—94.5
Int. Cl. H01s *3/00;* H04b *9/00;* G02f *1/28*
9 Claims This invention relates to optical masers or lasers, and more particularly to a method and apparatus for producing a laser beam having a single frequency.

A high gain gas laser, such as a helium-neon (He-Ne) laser, continuously emits a beam having several frequencies or modes, each with a high degree of spectral purity. The individual modes have known frequency spacings and oscillate simultaneously over the width of the amplifying atomic transitions. In other words, there are several well-defined high-Q resonator modes within the width of the amplifying transitions of the laser. In order to reduce the number of oscillating modes to obtain a single frequency device, the discharge intensity of the laser may be decreased so that the gain of the device exists only within a limited range close to the peak frequency of the atomic resonance. However, this results in a substantial reduction in power of the device, Another technique of suppressing multimode operation is reduction of the dimensions of the resonator with a consequence of similar reduction in power due to the smaller volume of gas available for lasing and increased sensitivity of the output power to minute physical changes in resonator spacing due to thermal differences or mechanical vibrations.

A single frequency laser is obtained in accordance with this invention by phase modulating a frequency modulated (FM) light beam. In one embodiment, the FM light beam is produced by phase locking a gas laser so that all of the laser modes oscillate with FM phases and Bessel function amplitudes and thereafter modulating the FM laser output to obtain a single frequency beam.

The FM laser has an optical length L and is phase-locked by inducing within the laser cavity a phase perturbation which varies at an angular frequency $\omega_0$. The value of $\omega_0$ is approximately but not exactly equal to $$\omega_m = \pi c/L \qquad (1)$$

where $c$ is the velocity of light, and $\omega_m$ is the frequency spacing between separate oscillating modes which would exist in the absence of the phase perturbation. The output light from the FM laser has a center frequency $\omega_c$ and sideband frequencies spaced from $\omega_c$ by integral multiples of $\omega_0$. In other words, the FM laser operates in such a manner that all of the laser modes oscillate with FM phases and with approximately Bessel function amplitudes thereby comprising the sidebands of a frequency-modulated signal.

The FM laser output is then passed through a phase modulator, such as an electro-optic crystal, driven at the locking frequency $\omega_0$ by the same driving oscillator that modulates the laser cavity but with a 180 degree phase change. The output of this modulator is a beam of light oscillating at a single frequency $\omega_c$ with substantially the same power as generated by the laser. In short, the energy of all of the modes of an FM laser is concentrated into one frequency. With an FM laser in which the mode coupling is accomplished with minimum loss, substantially all of the power which would be available from the same laser in a free-running state is now obtained at a single frequency.

An object of the invention is the provision of a laser capable of operating at a single optical frequency without substantial reduction of power.

Another object is the provision of a technique for producing a laser beam at a single frequency and at a high power level.

Another object is to provide maximum stability in the power output of a laser at a single frequency.

A further object is to convert with maximum efficiency FM light to light having a single frequency.

These and other objects of the invention will be understood from the following description of a preferred embodiment thereof reference being had to the accompanying drawings in which.

Figure 1:
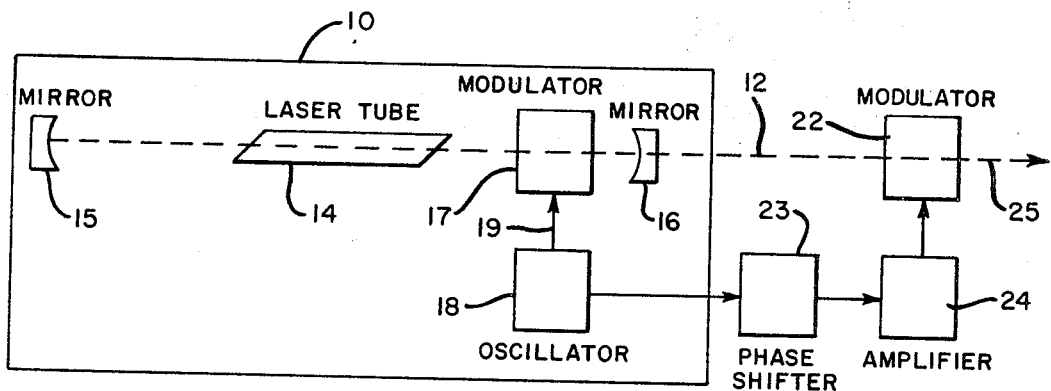
FIGURE 1 is a block diagram of an optical circuit embodying the invention.
Figure 2:
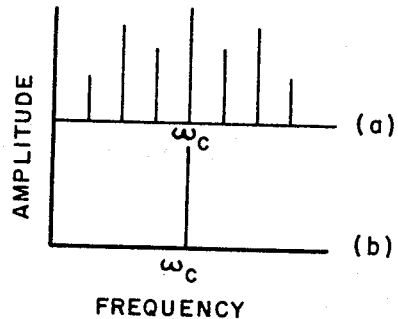
FIGURE 2 is a representation of the frequency distribution of the outputs of the FM laser and of the modulator.

Referring now to the drawings, a source 10 produces an FM light beam 12 characterized by a center frequency $\omega_c$ and a plurality of oscillating modes, see FIGURE 2 (*a*), that oscillate with FM phases and Bessel function amplitudes. The output 12 of the source 10 therefore is essentially a frequency modulated signal with the oscillating modes corresponding to sidebands of the signal.

An example of an FM light source 10 is a phase-locked laser described in an article entitled "FM Oscillation of the He-Ne Laser," by S. E. Harris and R. Targ, Applied Physics Letters, Nov. 15, 1964, pages 202 to 204. Briefly, the phase-locked laser comprises an He-Ne gas laser tube 14, a fully reflecting mirror 15 and a partial reflecting mirror 16 spaced from opposite ends of the tube and axially aligned therewith, and an electro-optic modulator 17, such as a crystal of potassium dihydrogen phosphate ($KH_2PO_4$), known as KDP, between mirror 16 and tube 14. A tunable radio frequency oscillator 18 having an output frequency $\omega_0$ is coupled by line 19 to modulator 17 and causes the latter to produce a single-pass phase retardation of the laser beam at oscillator frequency $\omega_0$. The output 12 of this phase-locked laser is a multimode beam with axial mode spacings or frequency separations equal to $\omega_0$ and a center frequency $\omega_c$, and is equivalent of a frequency modulated signal that is swept over the entire band of the laser at a sweep frequency approximately equal to $\omega_0$.

Laser beam 12 is then directed through and is modulated by an optical phase modulator 22, such as an electro-optic crystal of KDP, driven by the delayed and amplified output of locking oscillator 14. A phase shifter 23, such as a delay line, injects a 180 degree phase shift in the oscillator output and amplifier 24 amplifies it for application to modulator 22. The output 25 of modulator 22 is a light beam having a single frequency $\omega_c$, see FIGURE 2(*b*), with substantially the same power as generated by the laser device 10.

Figure 3:
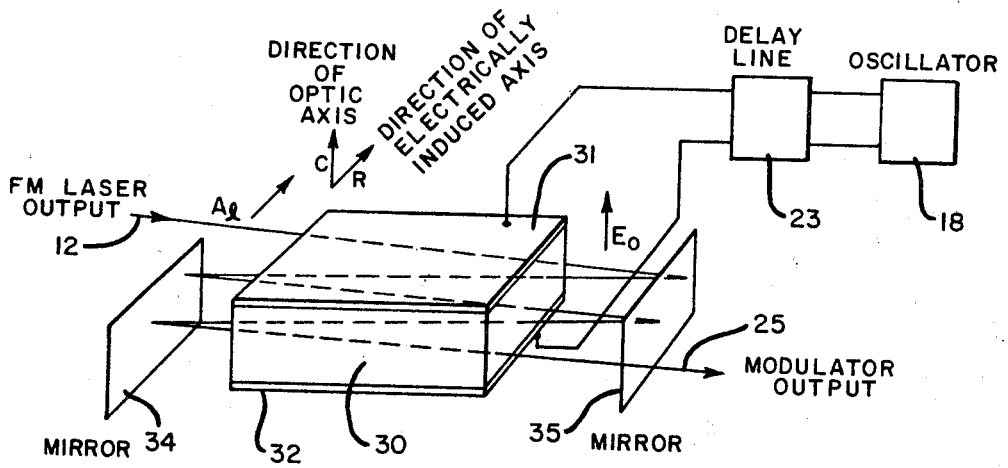
FIGURE 3 is a diagram of an electro-optic modulator utilized in an embodiment of the invention.

An electro-optic modulator 22 useful in producing the single frequency beam is shown in FIGURE 3. This modulator comprises an electro-optic crystal such as a block 30 of KDP having electrodes 31 and 32 on opposite parallel sides of the block which are perpendicular to the crystal optic axis C. Electrodes 31 and 32 are connected through delay line 23 to oscillator 18. The laser beam 12 into the block 30 is polarized as indicated by the vector $A_1$ in a direction perpendicular to the crystal optic axis C and parallel to a crystal axis R induced by the applied electric field $E_0$ of electrodes 31 and 32. As the field $E_0$ between the electrodes varies, the refractive index of the crystal for light polarized along the induced axis R also varies. This effectively changes the optical path length and causes a phase modulation to appear on the light. The phase modulation may be enhanced by reflecting the light through the crystal several times by means of a pair of totally reflecting mirrors 34 and 35 at opposite ends of the crystal, as shown. The mirror spacing is adjusted so that the light is modulated at the same phase on each traverse through the crystal. The single frequency light beam 25 emerges through partial mirror 35.

The FM laser output 12 can be described as an optical field that is sinusoidally modulated in phase according to the expression $$E(t) = E_0 \sin(\omega_c t + \delta_0 \sin \omega_0 t) \quad (2)$$

where $E_0$ is the peak amplitude, $\omega_c$ is the angular optical frequency at the center of the output spectrum, $\delta_0$ is the deviation ratio, and $\omega_0$ is the angular frequency difference between the locked modes.

This laser output is passed through phase modulator 22 driven at the locking frequency $\omega_0$ by the oscillator 18. The externally generated phase shift on the optical signal is expressed as $$\phi(t) = \delta_1 \sin(\omega_0 t + \theta) \quad (3)$$

where $\delta_1$ is the peak excursion of modulator 22 and $\theta$ is the relative phase shift between modulator 22 and the FM modulation on the laser output. The modulator drive amplitude is adjusted so that $\delta_1 = \delta_0$, the phase is adjusted to give $\theta = \pi$ radians, and the light output 25 from modulator 22 becomes $$E'(t) = E_0 \sin[\omega_c t + \delta_0 \sin \omega_0 t + \delta_0 \sin(\omega_0 t + \pi)] = E_0 \sin \omega_c t \quad (4)$$

Thus the total output of the laser is converted to a light beam having a single optical frequency $\omega_c$.

In addition to conversion of the output of the phase-locked laser without loss of power, the external modulator 22 is capable of operating at very high incident optical powers without damage to the modulator. Thus the amount of monochromatic light available is not limited by materials or laser cavity dimensions. Also, modulator 22 operates at one frequency only and thus drive power is not wasted in achieving bandwidth.

What is claimed is:

1. Apparatus for producing light having a single frequency comprising in combination:
    a source of frequency modulated (FM) light having a sweep frequency $\omega_0$ and a center frequency $\omega_c$, said source comprising:
        a laser having a cavity and producing a continuous output with a plurality of oscillating modes,
        a radio frequency oscillator having an output frequency $\omega_0$,
        a first phase modulator within said cavity and in the path of light generated by said laser connected to said oscillator output and producing single-pass phase retardation of the laser generated light at the oscillator frequency,
    a second phase modulator disposed in the path of said FM light, and
    a phase shifter having an input connected to the output of said oscillator and producing a phase shift of 180 degrees therein,
    said second modulator being connected to the output of said phase shifter whereby to modulate the phase of said FM light and produce light at the frequency $\omega_c$.

2. The combination according to claim 1 in which the oscillator frequency $\omega_0$ is approximately but not exactly equal to $$\pi c / L$$

where $c$ is the velocity of light and $L$ is the optical path length of the laser.

3. The combination according to claim 1 in which each of said modulators consists of an electro-optic material.

4. The combination according to claim 3 in which said material is a crystal of potassium dihydrogen phosphate ($KH_2PO_4$).

5. Apparatus for producing light having a single frequency comprising in combination:
    a source of frequency modulated (FM) light having a sweep frequency $\omega_0$, and
    means for varying the phase retardation of said FM light at a frequency equal to $\omega_0$ and $\pi$ radians out of phase with the modulation of the FM light.

6. The combination according to claim 5 in which said means comprises:
    an electro-optic modulator through which the FM light passes.

7. The combination according to claim 6 in which said modulator comprises a crystal of dihydrogen phosphate.

8. The method of producing light having a single frequency $\omega_c$ consisting of the steps of:
    generating frequency modulated (FM) light having a center frequency $\omega_c$ and a sweep frequency $\omega_0$, and
    retarding the phase of said FM light at a frequency equal to $\omega_0$ and $\pi$ radians out of phase with the modulation of the FM light.

9. The method of producing a beam of light oscillating at a single frequency $\omega_c$ consisting of the steps of:
    energizing a continuous laser and generating an output having a center frequency $\omega_c$,
    phase modulating the output of said laser at a predetermined frequency $\omega_0$ and producing frequency modulated (FM) light having a center frequency $\omega_c$ and a sweep frequency $\omega_0$, and
    phase modulating said FM light at said predetermined frequency $\omega_0$ and 180 degrees out of phase with the modulation of the FM light whereby to produce light oscillating at the frequency $\omega_c$.

References Cited

UNITED STATES PATENTS 3,243,722  3/1966  Billings _____ 331—94.5

JEWELL H. PEDERSEN, *Primary Examiner.*

W. L. SIKES, *Assistant Examiner.*

U.S. Cl. X.R.

350—160; 250—199